Nov. 13, 1934. G. P. TUSSAUD 1,980,838
PROCESS OF TREATING FAT AND OIL BEARING SEED PRODUCTS
Filed June 27, 1931
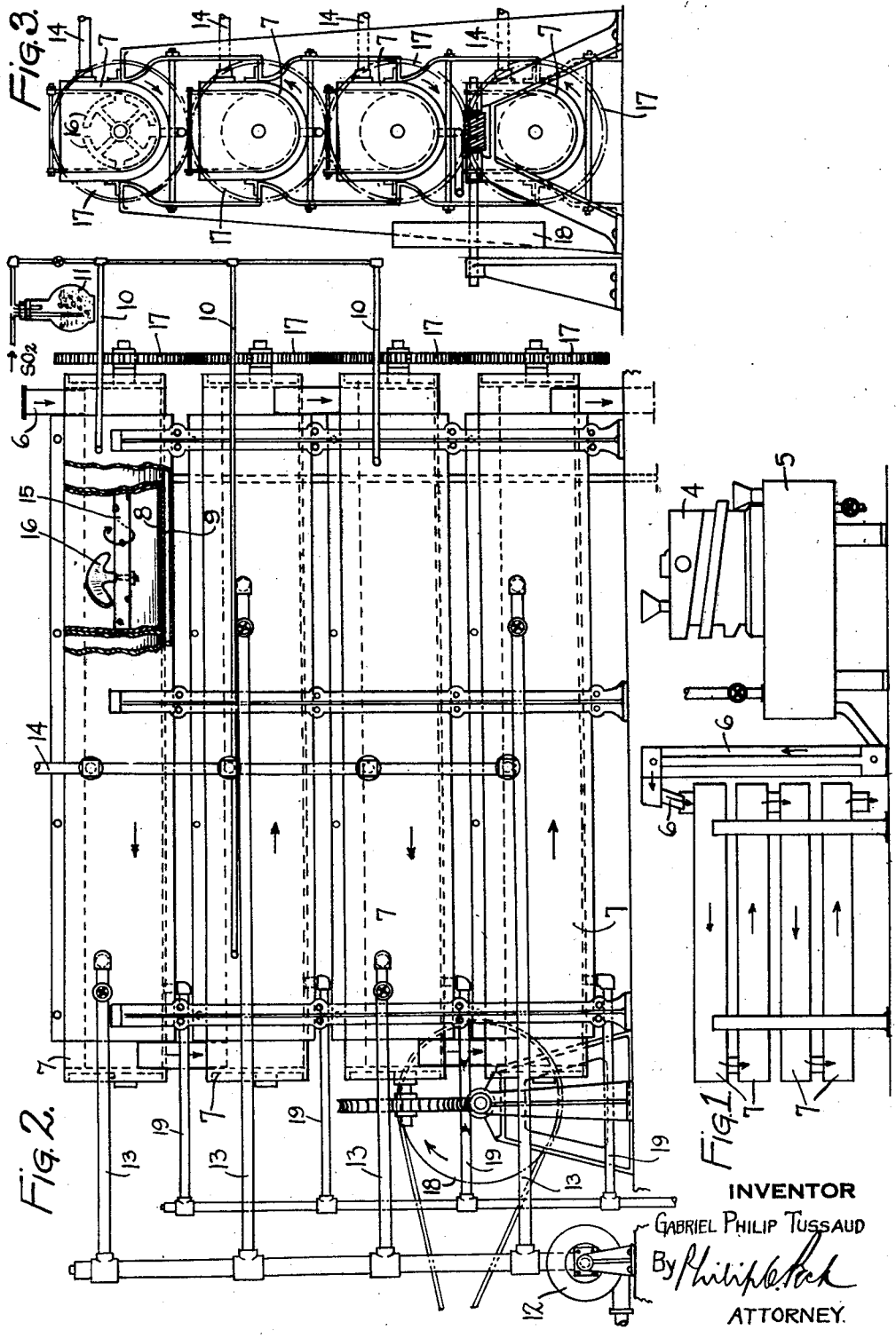
INVENTOR
GABRIEL PHILIP TUSSAUD
By Philip C. Peck
ATTORNEY.

Patented Nov. 13, 1934

1,980,838

UNITED STATES PATENT OFFICE 1,980,838

PROCESS OF TREATING FAT AND OIL-BEARING SEED PRODUCTS

Gabriel Philip Tussaud, Rickmansworth, England, assignor, by mesne assignments, to Arnold & Boyd, New York, N. Y.

Application June 27, 1931, Serial No. 547,287
In Great Britain December 16, 1930

8 Claims. (Cl. 99—10)

My invention relates generally to the treatment of fat and oil-bearing seeds such as seeds of cereals and of legumes, and the resulting products derived from such treatment.

It is known that some seeds are bitter and not immediately suitable for dietetic purposes and that other seeds on keeping, deteriorate. Again adverse conditions such as dampness favor decomposition changes in seeds due to the development and growth of micro-organisms such as bacteria and fungi. Obviously it is desirable and advantageous to remove bitter principles and/or to inhibit or retard such decomposition changes in seeds in order to improve their dietetic qualities and/or to maintain their market value.

My present invention has as its objects, among other things, to provide an improved process for treating fat and oil-bearing seeds in order to enhance their properties such as dietetic properties and/or keeping properties, and also the improved products resulting from this treatment.

According to my invention the new and improved process for treating fat and oil-bearing seeds broadly comprises subjecting the seeds to soaking in water and then subjecting the soaked seeds to the action of heat (for example to the action of a temperature between about 110° C. and 140° C.) and sulphur dioxide gas in the presence or absence of air, the treatment being so conducted that the bitter principles or other matters impairing the dietetic properties are removed or rendered innocuous, and also that the seeds on leaving the chamber or drum wherein the heat and sulphur dioxide treatment is conducted contain less moisture than in their natural state. For example, if seeds normally containing about 8 per cent of moisture are soaked in water until they have taken up about two and a half times their weight of water, the duration of the heat-steam-sulphur dioxide treatment is arranged so that the cooled off seeds contain about 4.5 per cent of moisture.

Preferably the treatment is effected in a continuous feed and delivery steam-jacketed oven having a non-corrosive and non-contaminable lining. Aluminium has been found a satisfactory lining for the ovens in my process.

An explanation of the treatment according to my improved process may be that the fats and oils of the water-soaked seeds are oxidized by the heat applied and then the oxidized matters are subjected to reduction by the sulphur dioxide under deodorizing, sterilizing antiseptic conditions.

In the drawing showing one form of apparatus in which my process may be practiced Fig. 1 is a diagrammatic side elevation of the general lay-out of the apparatus;

Fig. 2 is an enlarged side elevation of the heating ovens; and

Fig. 3 is an end view looking from the right of Fig. 2.

Similar numerals refer to similar parts throughout the several figures.

In applying the process to the stabilization of the fats and oils contained in soya beans, for example, which contain about 21½ per cent of fat, the beans which may be unshelled or shelled are first passed from a grain cleaner 4, in which the heavier dirt, stones, loose dust and the like are removed, to a washer 5 where they are washed for a period of two to three hours, this washing step removing all the dirt which often clings tenaciously to the surface of the shells. During the washing step the beans quickly absorb large quantities of water, which assists the subsequent removal of the shells if desired, by the shrinking back of the kernel in the subsequent baking process. The beans may now be pulverized or they may be treated whole in their shells. If for human consumption the beans are shelled by any of the ordinary decorticating processes, but if they are to be used in cattle food or for other purposes in which the palatability need not be good, the process is carried out with unshelled beans. The beans are now conveyed by means of a chain elevator 6 or a like conveyor to a series of ovens 7, preferably of the continuous feed and delivery type having a non-corrosive and non-contaminable lining 8, such as aluminium as stated above (four of such ovens being shown in the figures). The said ovens are preferably steam-jacketed at 9 and are provided with pipes 10 in the proximity to the feed entrance to the several ovens for injecting sulphur dioxide from the measuring device 11 from any suitable source of sulphur dioxide (not shown). Near the delivery ends of the ovens 7, a suitable vacuum pump or rotary exhauster 12 is connected by pipes 13 to the oven 7 for gently extracting the vapors and any free sulphur dioxide so as to enable the treated beans leaving the ovens 7 to be in a drier condition than in their natural state and when cooled off ready for storage or delivery etc.

The process is carried out at a temperature ranging from approximately 110° centigrade to 140° centigrade by means of steam injected to the ovens through the pipes 14 during which the seeds or beans absorb quantities of sulphur dioxide owing to the absorbing power of the water contained in the cells of the seeds or beans, whereby the sulphur dioxide reacts with the fat-containing cells of the seeds or beans and stabilizes them. For example, the soya beans usually remain in the ovens 7 for a period of approximately forty five minutes and are kept constantly stirred. This stirring is preferably effected by means of a screw conveyor 15 having radial beating arms 16 which on the revolution of the screw 15 through the intermeshing gears 17 driven from the pulley 18 cause the beans to be turned over and over and to be exposed continuously to the sulphur dioxide and evenly exposed to heat from the exterior of the ovens. The ovens 7 are drained through the outlets 19.

The beans which show on their split surfaces fissures apparently due to the shrinkage of the albuminous matters, etc., are now ready for grinding into flour or for any other purpose to which they may be put.

The beans contain approximately one and one fifth per cent of the complicated substance—lecithin ($C_{42}H_{84}NPO_8$). Thus:—

$$CH_2.O.CO.C_{17}H_{35}$$
$$CH.O.CO\ C_{15}H_{31}$$
$$CH_2.O.PO(OH).O.CH_2.CH_2.N.Me_3OH$$

which again constitutes a complicated fat or glyceride containing choline (hydroxy-ethyl-tri-methylamonium-hydroxide)

$$(CH_2OH.CH_2NMe_3.OH).$$

This choline is oxidizable to the corresponding acid:—Hydroxy-trimethyl-amidoacetic acid (anhydrous). Such anhydride is very similar to betain and has been mistaken as such in this bean.

Betain differs inasmuch as it is neutral, the carboxyl forming an internal ammonium salt with the amino group. The former is proved by the following two synthesis: (1) Its relation to glycol by union of trimethylamine with ethylic oxide and water and (2) by the successive action of methyl iodide and silver oxide (moist) on hydroxy ethylamine. Formed by hydration of vinylamine:

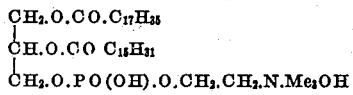

The comparative synthesis of betain as follows:

by synthesis from chloracetic acid and triethylamine and from glycosine and methyl iodide in presence of methyl alcohol.

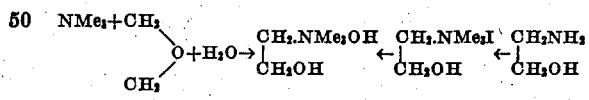

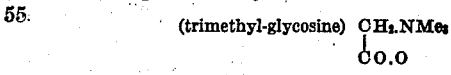

Although choline itself is harmless, its ethylene derivative, neurine, is poisonous. This neurine also occurs as one of the ptomaines formed in the putrefaction of albumen. (The bean contains about 43½% albumen on average).

It is easily seen that it is necessary to treat the soya bean if the subsequent flour is to be palatable and kept in a healthy form for human consumption. Especially for the synthesizing of milk for infants made from soya flour for which this product is particularly adaptable.

According to my theories, the $SO_2$ combined with the treatment previously explained has the following effect. The fats (about 21½%) are oxidized by the heating, and this oxide is reduced by the $SO_2$ under sterilizing and deodorizing conditions. This stabilizes the fats and prevents rancidity. The particles of lecithin (containing choline) which are surrounded by fat are attacked by the $SO_2$, the protecting layer of fat not having the strength to resist the action (probably a sulphite reduction) during the passage of the gas. The choline is hydrolyzed, partly as choline and partly as glycero-phosphoric acid, thus enabling the lecithin to go more easily into solution. The $SO_2$ has the power of entirely eliminating the bitter and beany flavor. It acts as an antiseptic, preventing putrefaction of the albumen, thus eliminating the formation of any fermentation bacillus and thus preventing the formation of neurine or fungi of decomposition, or any other harmful substance.

The beans have a honeycombed appearance and are full of cellular activities which enable the drying step to take place more easily and they may even leave the ovens without the necessity of further drying. The beans are lighter in color than those treated by formed methods though oxidation has been carried further so as to impart better keeping properties. The innermost cells are more rapidly and thoroughly penetrated due to the absorptive power of water for the sulphur dioxide. Further the albumen is less coagulated and the lecithin is less disturbed so that they pass into solution more readily than has hitherto been accomplished.

While the foregoing explanation appears reasonable, any and all theories and explanations of the workings of my process are disclaimed.

It has been found that seeds treated in accordance with this invention not only have improved dietetic qualities and keeping properties but that the flour or other products obtained therefrom also exhibit similar enhanced properties.

Thus, it has been found that soya beans treated in accordance with the process of this invention have lost their beaniness and bitterness and remain in a perfectly good condition for considerable lengths of time without showing signs of deterioration. Such beans may be employed with advantage for the manufacture of synthetic milk and other food products. It has also been found that biscuits made from the flour obtained from wheat, which has been similarly treated, show extremely good keeping properties.

Furthermore my improved methods for stabilizing has been found to increase the keeping properties of barley, wheat, and fat and oil-bearing seeds in general including the waste and by-products of milk such as whey in the manufacture of cattle foods. But as hereinbefore noted, my processes are particularly applicable to the treatment of soya beans.

I claim as my invention:

1. A process for treating fat and oil-bearing seeds which comprises soaking same in water and then heating the water-soaked seeds between 110° and 140° C. in the presence of sulphur dioxide gas whereby the fatty and other decomposing constituents therein become stabilized.

2. A process for treating fat and oil-bearing seeds which comprises soaking same in water and then heating the water-soaked seeds between 110° and 140° C. in the presence of sulphur dioxide gas for about forty-five minutes whereby the fatty and other decomposing constituents therein become stabilized.

3. A process for treating fat and oil-bearing seeds which comprises soaking same in water and then heating the water-soaked seeds between 110° and 140° C. in the presence of sulphur dioxide gas while stirring same whereby the fatty and other decomposing constituents therein become stabilized.

4. A process for treating fat and oil-bearing seeds which comprises soaking same in water and then heating the water-soaked seeds between 110° and 140° C. in the presence of sulphur dioxide gas for about forty-five minutes while stirring same whereby the fatty and other decomposing constituents therein become stabilized.

5. A process for treating soya beans which comprises soaking same in water and then heating the water-soaked beans between 110° and 140° C. in the presence of sulphur dioxide gas whereby the fatty and other decomposing constituents therein become stabilized.

6. In a process for treating water-saturated fat and oil-bearing seeds the step which consists in heating same between 110° and 140° C. in the presence of sulphur dioxide gas whereby the fatty and other decomposing constituents therein become stabilized.

7. A process for treating soya beans which comprises soaking same in water, then heating the water-soaked beans between 110° and 140° C. in the presence of sulphur dioxide gas to stabilize the fatty constituents of the beans, and continuing the heating until the moisture-content of the beans is less than in their natural state whereby the fatty and other decomposing constituents therein become stabilized.

8. A process for treating soya beans which comprises soaking same in water, then heating the water-soaked beans between 110° and 140° C. in the presence of sulphur dioxide gas to stabilize the fatty constituents of the beans, and continuing the heating until the moisture-content of the beans is less than in their natural state while removing the water vapors and free sulphur dioxide whereby the fatty and other decomposing constituents therein become stabilized.

GABRIEL PHILIP TUSSAUD.